June 10, 1930.　　J. T. WORTHINGTON　　1,762,538
WATER LEVEL CONTROLLING DEVICE
Filed April 16, 1923
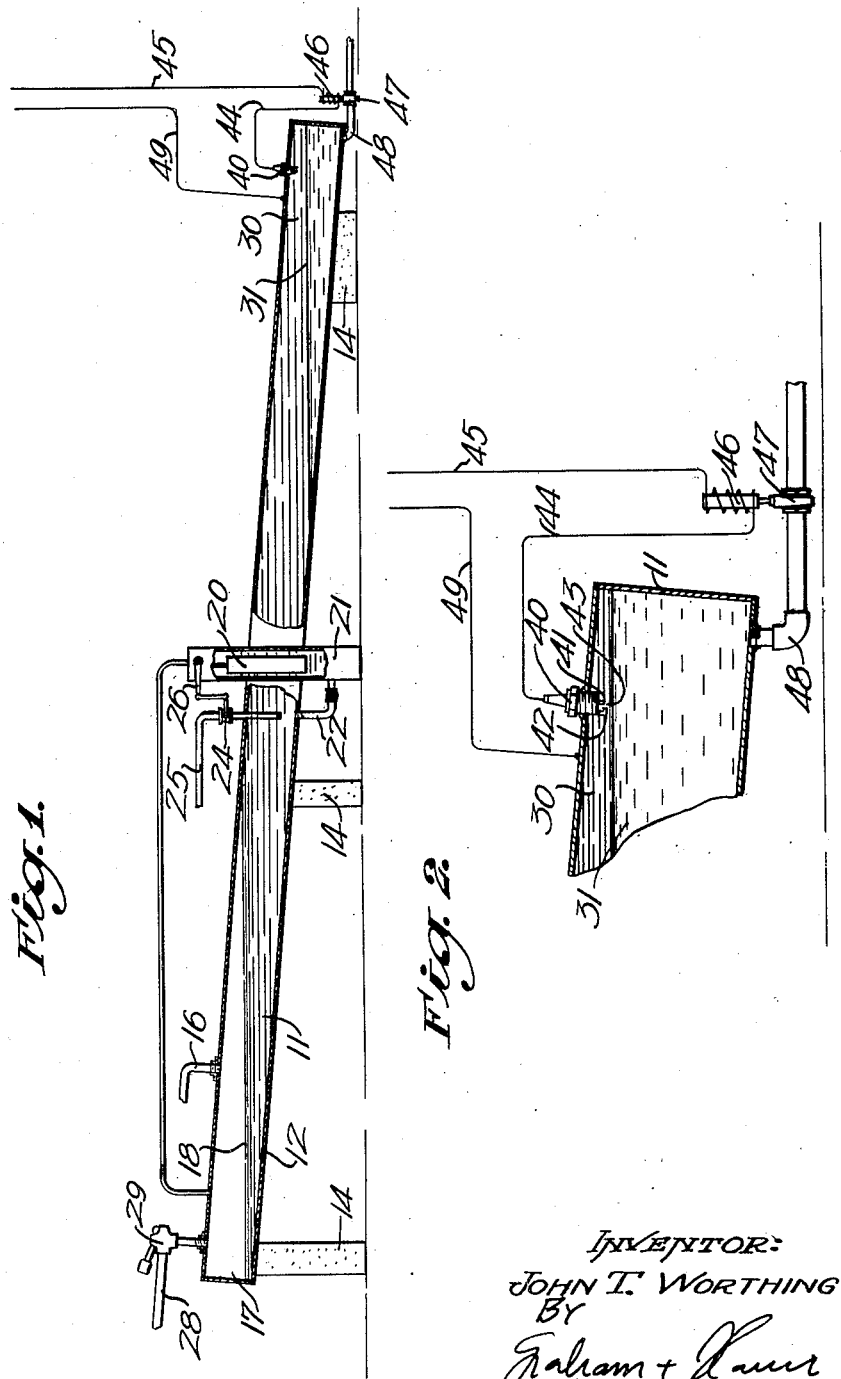
INVENTOR:
JOHN T. WORTHINGTON,
BY
Graham + Lauer
ATTORNEYS.

Patented June 10, 1930

1,762,538

UNITED STATES PATENT OFFICE

JOHN T. WORTHINGTON, OF WHITTIER, CALIFORNIA, ASSIGNOR TO PETROLEUM RECTIFYING COMPANY OF CALIFORNIA, OF SAN FRANCISCO, CALIFORNIA, A CORPORATION OF CALIFORNIA

WATER-LEVEL-CONTROLLING DEVICE

Application filed April 16, 1923. Serial No. 632,586.

This invention relates to oil, water, and gas separators and relates particularly to an electrical water-level control.

In the oil producing industry, the crude petroleum oil from the wells contains natural gas, which is a valuable by-product, and water which must be separated from the oil. This crude oil is piped from the well to a separator where the oil, water and gas are separated, the gas being piped therefrom to a storage tank, the water being separated from the crude oil by gravitation is drained from the separator and the oil is delivered therefrom to storage tanks or refining apparatus. The water level in these separators is controlled by a valve operating means which opens a valve and allows the water to flow from the separator when the water rises above a certain level and closes when it falls below this level, this arrangement being provided to prevent the collection of a surplus of water in the separator, and also to prevent the water level from falling low enough to allow the oil to pass through the water outlet.

It is an object of the invention to provide a water-level control which will be electrically operated.

It is another object to provide a water-level control which will be positive in its operation.

It is a further object of the invention to provide a control of this character which will maintain the water at a substantially constant level.

A further object of the invention is to provide a novel method of maintaining a constant liquid level in a container.

Additional advantages of the invention and further objects thereof will be made evident hereinafter.

Referring to the drawing which is for illustrative purposes only:

Fig. 1 is a diagrammatic side elevation, partially in section, of a separator utilizing a water-level control of my invention.

Fig. 2 is an enlarged view of the lower end of the separator, which very clearly illustrates water level control.

The separator 11, shown in Fig. 1, consists of a shell 12 adapted to receive the water, gas and oil at the same pressure these are under in the well. The shell 12 rests on foundation members 14, and is disposed on an incline as shown. Crude oil, containing gas and water, enters the separator 11 directly from the well through the inlet pipe 16, which is connected to the top of the well. The provision of the pipe 16, which is of comparatively large diameter and connected to the well and the separator adapted to hold oil, gas and water at well pressure, is differentiated from the usual mechanism which comprises a nozzle having a constricted orifice through which the oil and water flow from the well. When the constricted nozzle is employed, an emulsion of oil and water is formed on account of the comparatively high velocity with which the gas, oil and water issue through the constricted passage. Obviously, this emulsion requires special treatment to separate the oil and water. The employment of the separator herein described which is connected to the well by piping not having a constricted passage, obviates the formation of an emulsion of oil and water. The inlet pipe 16 is located near the high end 17 thereof, the oil assuming a level in the separator 11 as indicated at 18. The oil level 18 is controlled by a float 20 which floats on a body of oil in a float shell 21. The interior of the float shell 21 is connected to the separator by a pipe 22 so that the oil level in the separator will be reproduced in the shell 21. In the event that the oil level in the separator rises, the level in the float shell will also rise, thereby raising the float 20 which in turn opens the valve 24 in the oil outlet 25 through suitable mechanism 26 and allows the oil to exit from the separator in proportion to the entrance of the crude oil.

The natural gas contained in the oil being the lightest of the three components of the product of the well fills the upper portion 17 of the shell 12 and is carried off therefrom through a pipe 28 which has a pressure regulating valve 29 which maintains a pressure in the separator for forcing the oil through the pipe 25 when the valve 24 permits A pressure equalizing pipe is connected between the end 17 of the shell 12 and the upper part of the float shell so that any gas collecting in the float shell 21 will not have effect upon the level of the oil contained therein in the separator.

The water contained in the crude oil being heavier than the oil will drop to the lower end 30 of the separator and assume a level as indicated at 31.

With special reference to Fig. 2, my invention provides a member 40, which may be an ordinary spark plug, as shown, which is screwed into the shell 12 and has electrodes 41 and 42 situated at the inner end thereof which electrodes have a small gap 43 therebetween. The electrode 41 is insulated from the shell of the member 40 and has connected thereto one side 44 of a low voltage electrical circuit 45, which includes a solenoid 46, which solenoid operates a valve 47 located in the water outlet pipe 48. The other electrode 42 makes contact with other side 49 of the circuit 45 through the shell of the plug 40 and shell of the separator 11. When the water level 31 in the shell 12 is as shown the oil therein surrounds the electrodes 41 and 42 and prevents the electric current from flowing in the circuit due to the fact that the oil is a non-conductor of electricity. But as more water accumulates in the portion 30 of the separator 11, the water level 31 will rise and surround the electrodes 41 and 42, the water being a conductor of electricity will allow current to flow across the gap 43 and thereby closes the circuit 45. The current passing therethrough energizes the solenoid 46 which opens the valve 47 and allows the water to flow out of the separator 11 through the pipe 48 until the water level 31 again falls below the electrodes 41 and 42.

The action of the water level control herein described is very sensitive in action, and is not affected by a change in density of the oil delivered thereunto. Furthermore, the arrangement of parts is very simple, yet is more positive in action than most float or trap water level controls of more expensive construction.

I claim as my invention:

1. In a device for maintaining a substantially constant level of a surface of contact between two bodies of liquid having dissimilar electrical conductivities, the combination of: a shell containing said bodies of liquids; a pair of electrodes extending into an intermediate section of said shell, said intermediate section being at the desired level of said surface of contact; means for impressing a potential difference across said electrodes; a valve controlling the position of said surface of contact; and valve-control means in circuit with said means and with said electrodes for operating said valve to move said surface of contact away from said electrodes, said valve-control means operating said valve in response to the differences in current flowing between said electrodes at different positions of said surface of contact relative to said electrodes.

2. In a device for separating oil and water, and maintaining a surface of contact therebetween which is substantially constant in position, the combination of: a shell; means for supplying intermixed oil and water to said shell where said oil and water may gravitationally separate; a pair of electrodes extending into said shell at an intermediate section theref, at which section it is desired to maintain said surface of contact; means for establishing a difference in potential across said electrodes whereby an increased current flows therebetween when said surface of contact rises to permit water to form a conducting path between said electrodes; pipe means for withdrawing water from said shell at a point below said intermediate section; a valve in said pipe means; valve-control means in circuit with said electrodes and adapted to open said valve to lower said surface of contact when said electrodes are electrically connected through said water, but to close said valve when said electrodes are not so connected; and means for withdrawing oil from said shell at a point above said intermediate section.

3. A combination as defined in claim 1 in which said electrodes comprise the sparking terminals of a spark plug.

4. A combination as defined in claim 2 in which said electrodes comprise the sparking terminals of a spark plug.

In testimony whereof, I have hereunto set my hand at Los Angeles, California, this 9th day of April, 1923.

JOHN T. WORTHINGTON.